United States Patent
Maciejczyk

(10) Patent No.: US 9,174,554 B2
(45) Date of Patent: Nov. 3, 2015

(54) SEAT BELT LOCK-OFF FOR A SAFETY SEAT

(71) Applicant: Britax Childcare Pty Ltd, Victoria (AU)

(72) Inventor: Wieslaw Maciejczyk, Victoria (AU)

(73) Assignee: BRITAX CHILDCARE PTY LTD., Victoria (AU)

( * ) Notice: Subject to any disclaimer, the term of this patent is extended or adjusted under 35 U.S.C. 154(b) by 27 days.

(21) Appl. No.: 13/886,997

(22) Filed: May 3, 2013

(65) Prior Publication Data

US 2013/0300170 A1    Nov. 14, 2013

(30) Foreign Application Priority Data

May 9, 2012    (AU) ................. 2012901886

(51) Int. Cl.
  *A47D 1/10*    (2006.01)
  *B60N 2/26*    (2006.01)
  *B60N 2/28*    (2006.01)

(52) U.S. Cl.
  CPC ............ *B60N 2/265* (2013.01); *B60N 2/286* (2013.01); *B60N 2/2806* (2013.01)

(58) Field of Classification Search
  USPC ............ 297/250.1, 254, 255, 256, 479, 485, 297/484; 403/152, 161, 163, 165
  See application file for complete search history.

(56) References Cited

U.S. PATENT DOCUMENTS

| | | | | |
|---|---|---|---|---|
| 3,287,062 A * | 11/1966 | Board et al. | ...... | 297/479 |
| 3,649,076 A * | 3/1972 | Blake | ...... | 297/479 |
| 3,695,697 A * | 10/1972 | Stoffel | ...... | 297/479 |
| 3,847,434 A * | 11/1974 | Weman | ...... | 297/478 |
| 4,323,204 A * | 4/1982 | Takada | ...... | 242/381.4 |
| 4,484,766 A * | 11/1984 | Buchmeier | ...... | 280/808 |
| 4,491,343 A * | 1/1985 | Fohl | ...... | 280/801.1 |
| 4,682,791 A * | 7/1987 | Ernst | ...... | 280/806 |
| 4,854,639 A * | 8/1989 | Burleigh et al. | ...... | 297/250.1 |
| 4,912,818 A * | 4/1990 | Meeker | ...... | 24/170 |
| 5,031,962 A * | 7/1991 | Lee | ...... | 297/484 |
| 5,160,186 A * | 11/1992 | Lee | ...... | 297/479 |
| 5,411,292 A * | 5/1995 | Collins et al. | ...... | 280/806 |
| 5,527,094 A * | 6/1996 | Hiramatsu et al. | ...... | 297/250.1 |
| 5,630,645 A * | 5/1997 | Lumley et al. | ...... | 297/250.1 |
| 6,152,528 A * | 11/2000 | van Montfort | ...... | 297/250.1 |
| 6,217,069 B1 * | 4/2001 | Ganesan | ...... | 280/801.1 |
| 6,260,884 B1 * | 7/2001 | Bittner et al. | ...... | 280/806 |
| 6,390,562 B1 * | 5/2002 | Takamizu et al. | ...... | 297/483 |
| 6,447,060 B1 * | 9/2002 | Vila et al. | ...... | 297/256.13 |
| 6,474,691 B2 * | 11/2002 | Izume et al. | ...... | 280/801.1 |
| 6,749,223 B2 * | 6/2004 | Kazuo et al. | ...... | 280/801.1 |

(Continued)

FOREIGN PATENT DOCUMENTS

| | | | | |
|---|---|---|---|---|
| EP | 377861 A2 * | 7/1990 | ...... | B60R 22/18 |
| JP | 01094053 A * | 4/1989 | ...... | B60R 22/26 |

*Primary Examiner* — David E Allred
(74) *Attorney, Agent, or Firm* — Nelson Mullins Riley & Scarborough LLP

(57) ABSTRACT

This invention relates to a guide for a vehicle seat belt securing a child safety seat in the vehicle. The belt guide comprises a body, a slot extending into the body from an edge thereof and having a longitudinal axis, the slot further extending through the body in a direction transverse to its longitudinal axis, and wherein the belt guide further comprises means adapted to permit movement of the belt lengthwise along the slot, and transversely through the slot in one direction, but not the other. An associated child safety seat comprising a guide is also disclosed.

10 Claims, 3 Drawing Sheets

(56) References Cited

U.S. PATENT DOCUMENTS

| | | | |
|---|---|---|---|
| 6,986,548 B2* | 1/2006 | Jane Santamaria | 297/250.1 |
| 7,703,806 B2* | 4/2010 | Bell et al. | 280/805 |
| 7,926,874 B2* | 4/2011 | Hendry | 297/256.16 |
| 8,313,142 B2* | 11/2012 | Xiao | 297/256.16 |
| 8,777,323 B2* | 7/2014 | Merrill et al. | 297/484 |
| 2002/0043838 A1* | 4/2002 | Yanaka et al. | 297/250.1 |
| 2004/0021362 A1* | 2/2004 | Barnes | 297/483 |
| 2006/0261649 A1* | 11/2006 | Baldwin et al. | 297/250.1 |
| 2008/0001466 A1* | 1/2008 | Patrizi et al. | 297/485 |
| 2011/0049952 A1* | 3/2011 | Xiao | 297/256.16 |

* cited by examiner

SEAT BELT LOCK-OFF FOR A SAFETY SEAT

CROSS-REFERENCE TO RELATED APPLICATIONS

This application claims priority to Australian Provisional Patent Application No. 2012901886, filed May 9, 2012, titled "SEAT BELT LOCK-OFF FOR A SAFETY SEAT", the entire contents of which are incorporated herein by reference.

FIELD OF THE INVENTION

The present invention relates to a guide for a vehicle seat belt securing a child safety seat in the vehicle, and a child safety seat comprising such a belt guide.

BACKGROUND

Children that have outgrown a rearward facing restraint must be moved into forward facing child safety seat comprising a harness for the child, and which is secured in the vehicle by the vehicle seatbelt and a tether strap.

In the event of a sudden deceleration, as occurs in a vehicle impact, any slack in the vehicle seat belt will permit at least some forward travel of the child safety seat, resulting in potentially harmful shock loads for both the seat and, more importantly, its occupant.

It is against this background that the present invention has been developed.

Other objects and advantages of the present invention will become apparent from the following description, taken in connection with the accompanying drawings, wherein, by way of illustration and example, an embodiment of the present invention is disclosed.

SUMMARY OF THE INVENTION

In one aspect, the invention may be said to reside in a guide for a vehicle seat belt securing a child safety seat in the vehicle, the belt guide comprising a body, a slot extending into the body from an edge thereof and having a longitudinal axis, the slot further extending through the body in a direction transverse to its longitudinal axis, and wherein the belt guide further comprises means adapted to permit movement of the belt lengthwise along the slot, and transversely through the slot in one direction, but not the other.

In one form, said means is operative by transverse movement of the belt in the impermissible direction to provide a locking effect which prevents further movement of the belt.

In one form, the locking effect is provided by a clamping action which grips the belt.

In one form, the guide further comprises a generally u-shaped body comprising a pair of arms separated by the slot, all of which extend in the direction of elongation of the slot.

In one form, one of the arms comprises a fixed jaw portion directed toward the slot, and the other arm supports a clamping member operative to move between a first position in which the clamping member clamps the belt between itself and the fixed jaw portion, and a second position in which the belt is released.

In one form, the clamping member comprises a cylindrical hinge pin portion from which their depends a jaw portion and a lever arm operative by transverse movement of the belt in the impermissible direction to cause rotation of the clamping member about its cylindrical hinge pin portion to effect clamping of the belt firmly between the opposing jaws portions.

Alternatively, said means could employ cams, springs and/or ratchet and pawl arrangements to achieve this effect.

In a further aspect, the invention may be said to reside in a guide for a vehicle seat belt securing a child safety seat in the vehicle, the belt guide comprising a body having a pair of sides, and a slot extending into the body from an edge thereof and transversely from one of the pair of sides of the body to the other, and wherein the belt guide further comprises means adapted to permit movement of the belt lengthwise along the slot, and transversely through the slot in one direction, but not the other.

In a further aspect, the invention may be said to reside in a child safety seat comprising a guide as described above.

In a further aspect, the invention may be said to reside in a child safety seat comprising a passageway for insertion of a vehicle seat belt therethrough, and a belt guide comprising a body, a slot extending from the passageway into the body and having a longitudinal axis, the slot further extending through the body in a direction transverse to its longitudinal axis, and wherein the belt guide further comprises means adapted to permit movement of the belt lengthwise along the slot, and transversely through the slot in one direction, but not the other.

In one form, said means is operative by transverse movement of the belt in the impermissible direction to provide a locking effect which prevents further movement of the belt.

In one form, the child safety seat comprises opposing outwardly facing sides, each of which comprises a belt guide, so that there is a belt guide accessible irrespective of which side of the seat is the outboard side.

In one form, the impermissible direction for the or each belt guide is the one which permits loosening of or provision of slack to the belt.

A detailed description of one or more embodiments of the invention is provided below along with accompanying figures that illustrate by way of example the principles of the invention.

While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF THE DRAWINGS

For a better understanding of this disclosure it will now be described with respect to an exemplary embodiment which shall be described herein with the assistance of drawings wherein.

DESCRIPTION OF A PREFERRED EMBODIMENT

Figure 1:
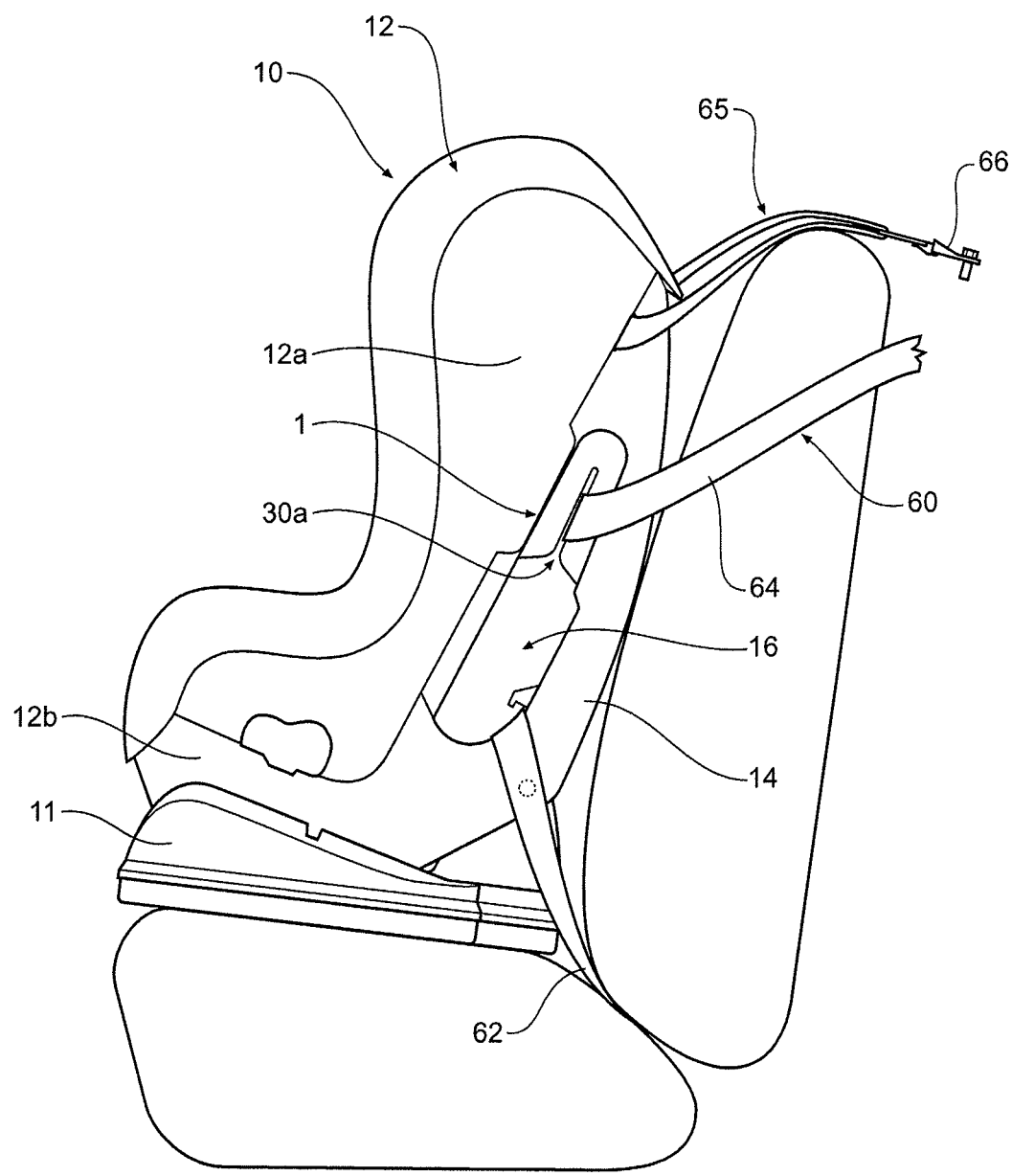
FIG. 1 is a side elevation of a child safety seat incorporating a belt guide.

In the following description, like reference characters designate like or corresponding parts throughout the several views of the drawings.

Referring now to FIG. 1, where there is illustrated a child safety seat 10 comprising a seat 12, and a base 11 for the seat 12. The seat 12 is a moulded polymeric component comprising a backrest portion 12a and a seat portion 12b.

Extending on a rear side of the backrest portion 12a of the seat 12 is reinforcing structure 14 for the same, through which there extends a passageway 16 extending from one side of the seat 12 to the other.

The child safety seat 10 is secured in a vehicle using a vehicle seat belt 60 passed through passageway 16, and a tether strap 65 extending from an upper portion of the seat-back portion 12a of the seat 12 to a vehicle anchor point 66.

The vehicle seat belt 60 is a conventional 3-point restraint system using a single length of webbing (or belt) to provide both lap and shoulder restraint in the form of a lap belt portion 62 and a sash belt portion 64 respectively. The belt 60 passes from an upper outboard attachment point on the vehicle, down, across and through the passageway 16 to a slip-joint on the buckle connector, and from there back through the passageway 16 to an outboard floor attachment point on the vehicle.

Mounted on each of a pair of opposing outwardly facing sides of the reinforcing structure 14 in a position at an upper end of the passageway 16 is a belt guide 1 for the sash belt portion 64 of the vehicle seat belt 60. The child safety seat 10 is fitted with a belt guide 1 on both sides thereof so that there is a belt guide 1 accessible irrespective of which side of the vehicle the child safety seat 10 is fitted, and which side of the seat 12 is the outboard side as a result.

Figure 2:
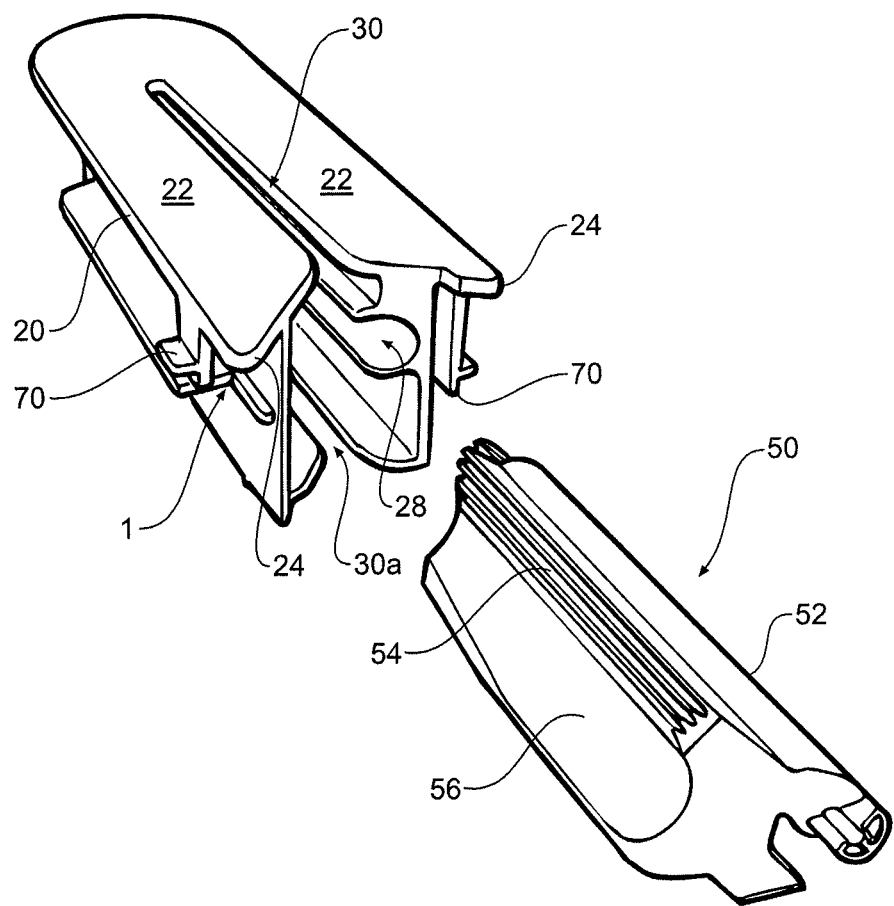
FIG. 2 is an exploded view of the belt guide from the child safety seat illustrated in FIGS. 1.
Figure 3:
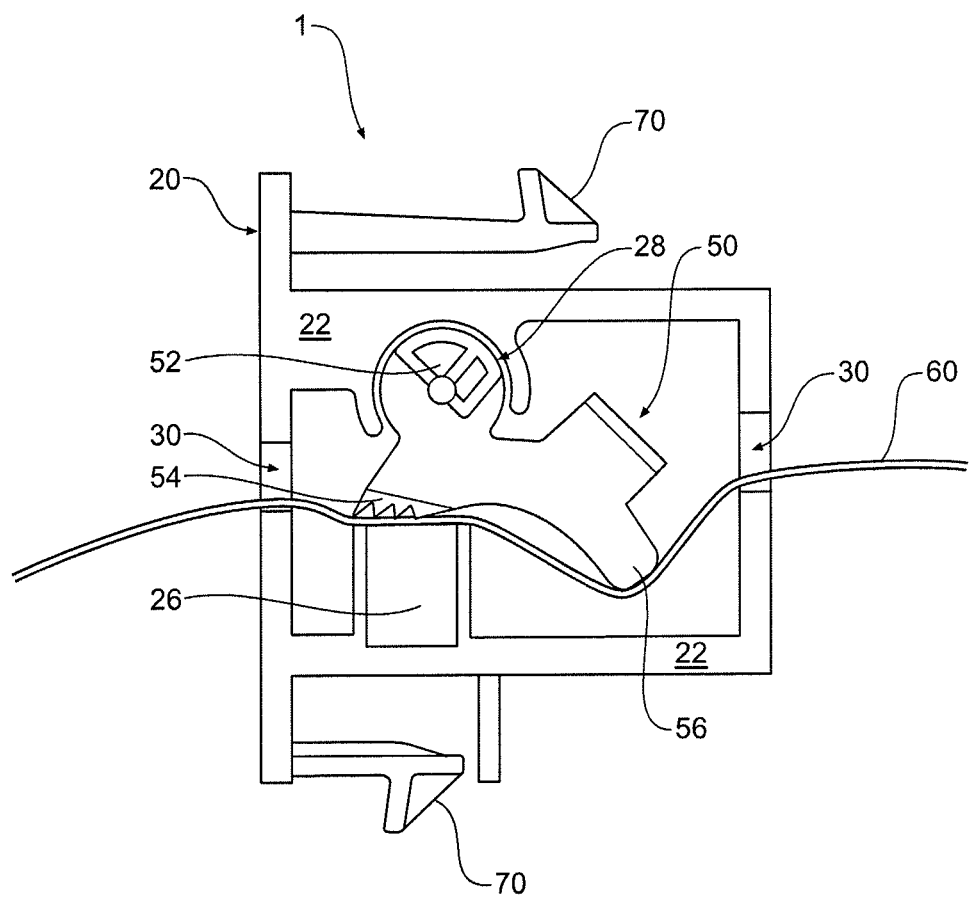
FIG. 3 is an end elevation of the belt guide illustrated in FIG. 2.

Referring now to FIGS. 2 and 3, where it can be seen how the belt guide 1 comprises a generally u-shaped and elongate body 20 formed as a one-piece plastics moulding, said body 20 comprising a pair of arms 22 separated by a slot 30, all of which extend in the direction of elongation of the slot 30.

The body 20 comprises a flange 24 forming an outboard face for flush fit in the side of the child safety seat 10, from a rear side of which their extends cantilever snap-fits 70 via which the belt guide 1 is secured to the seat portion 12 of the child safety seat 10 in such a way that the slot 30 in the belt guide 1 has an entranceway 30a which opens into the passageway 16. The slot 30 extends into the body 20 from this entranceway 30a. The slot 30 has a longitudinal axis, and further extends through the body 20 in a direction transverse to its longitudinal axis (ie. in an outboard-inboard direction).

The belt guide 1 further comprises means adapted to permit movement of the sash belt portion 64 lengthwise along the slot 30 (for insertion and removal), and transversely through the slot 30 in one direction, but not the other (for tightening, but not loosening).

Internally, one of the arms 22 of the body 20 comprises a fixed jaw portion 26 directed toward the slot 30, and the other arm 22 comprises an opposing hinge pin receiving portion 28, both of which similarly extend in the direction of elongation of the body 20 on either side of the slot 30.

The belt guide comprises a movable clamping member 50 formed as a one-piece plastics moulding, which is supported by the body 20 of the belt guide 1. The clamping member 50 comprises a cylindrical hinge pin portion 52 from which their depends an elongate jaw portion 54 (which is serrated for improved grip upon the belt 60), and an arcuate lever arm portion 56 which initially recedes away form the jaw portion 54 as it extends laterally away from this before curving back toward the level of the jaw portion 54.

The cylindrical hinge pin portion 52 of the clamping member 50 is pivotally supported in the hinge pin receiving portion 28 of the guide body 20 so that the jaw portion 54 of the clamping member 50 opposes the fixed jaw portion 26 of the body 20, and the lever arm 56 extends into the body 20 in the direction of the inboard side of the body 20.

In use, the child safety seat 10 is positioned in the vehicle so as to be forward facing and centrally aligned in the chosen seating position.

The seat belt 60 is fully lengthened and inserted through the passageway 16 in the seat 12 and the seat belt buckle and tongue are secured. All slack is removed from the lap belt portion 62 of the seat belt 60 by pulling the sash belt portion 64 until the child safety seat 1 is held firmly against the vehicle seat.

The sash belt portion 64 is then fed edge first from the passageway 16 into the entranceway 30a of the slot 30 in the body 20 of the belt guide 1 until the full width of the belt 60 lies wholly within the slot 30. Both the entranceway 30a and the end of the clamping member 50 at the entranceway 30a end are shaped to guide the belt 60 between the jaw portions 26 and 54.

With the belt 60 so inserted, the belt guide 1 will permit the sash belt portion 64 to travel in the direction of belt tightening (i.e. in an outboard direction). However, any attempt to pull the sash belt portion 64 in the opposite direction (ie. inboard, or towards the seat belt buckle and tongue) will cause the belt to bear against the distal end of the lever arm 56 of the clamping member 50, causing a rotation of the clamping member 50 about its hinge pin portion 52 which drives the jaw portion 54 of the clamping member 50 firmly against the jaw portion of the guide body 20, clamping the belt firmly between these jaws portions, and preventing any loosening of or provision of slack to the belt. That is to say, the belt guide 1 provides a 'lock-off' effect. In this way the belt guide prevents such loosening of or provision of slack to the belt which can be so harmful in the event of an impact.

It will be further appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

All publications mentioned in this specification are herein incorporated by reference. Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia or elsewhere before the priority date of each claim of this application.

The invention claimed is:
1. A guide for a vehicle seat belt securing a child safety seat in the vehicle, the guide comprising:

a body, a slot for receiving the belt, the slot having a longitudinal axis extending into the body from an edge thereof so as to separate a pair of arms of the body, the slot further extending through the body in a direction transverse to the longitudinal axis, and wherein one of the arms comprises a fixed jaw portion directed toward the slot, and the other arm comprises a hinge pin receiver in a wall opposite and facing the one of the arms relative to the slot, and a clamping member comprising a hinge pin portion, rotatably coupled to the hinge pin receiver from which there depends a lever arm and a jaw portion, wherein movement of the belt transversely through the slot in a first direction, causes the belt to bear against the lever arm, causing a rotation of the clamping member about the hinge pin portion which drives the jaw portion of the clamping member against the fixed jaw portion, clamping the belt between the jaw portion of the clamping member and the fixed jaw portion and, wherein movement of the belt transversely through the slot in a second direction causes rotation of the clamping member away from the fixed jaw portion permitting movement of the belt.

2. The guide of claim 1, wherein clamping the belt between the jaw portion of the clamping member and the fixed jaw portion prevents further movement of the belt transversely through the slot in said first direction.

3. The guide as in claim 1, wherein the body is generally u-shaped about the slot, and extends in a direction of elongation of the slot.

4. The guide of claim 1, wherein the clamping member is operative to move between a first position in which the jaw portion of the clamping member clamps the belt between itself and the fixed jaw portion, and a second position in which the belt is released.

5. The guide as in claim 1, wherein the body is formed as a one-piece plastics moulding.

6. The guide as in claim 4, wherein the clamping member is a one-piece plastics moulding.

7. A child safety seat comprising;

a passageway for insertion of a vehicle seat belt therethrough, and a belt guide comprising:

a body, a slot for receiving the belt, the slot having a longitudinal axis extending from the passageway into the body so as to separate a pair of arms of the body, the slot further extending through the body in a direction transverse to the longitudinal axis, and wherein one of the arms comprises a fixed jaw portion directed toward the slot, and the other arm comprises a hinge pin receiver in a wall opposite and facing the one of the arms relative to the slot, and a clamping member comprising a hinge pin portion, rotatably coupled to the hinge pin receiver, from which there depends a lever arm and a jaw portion, wherein movement of the belt transversely through the slot in a first direction, causes the belt to bear against the lever arm, causing a rotation of the clamping member about the hinge pin portion which drives the jaw portion of the clamping member against the fixed jaw portion, clamping the belt between the jaw portion of the clamping member and the fixed jaw portion, and wherein movement of the belt transversely through the slot in a second direction causes rotation of the clamping member away from the fixed jaw portion permitting movement of the belt.

8. The child safety seat of claim 7, wherein clamping the belt between the jaw portion of the clamping member and the fixed jaw portion prevents further movement of the belt transversely through the slot in said first direction.

9. The child safety seat of claim 7, comprising opposing outwardly facing sides, each of which comprises a belt guide, so that there is a belt guide accessible irrespective of which side of the seat is the outboard side.

10. The guide of claim 7, wherein the slot of the belt guide comprises an entranceway which opens into the passageway.

* * * * *